July 24, 1951  C. H. SUTHERLAND  2,561,428
FIELD-COIL PUNCHING AND COIL
Filed July 17, 1948  2 Sheets-Sheet 1
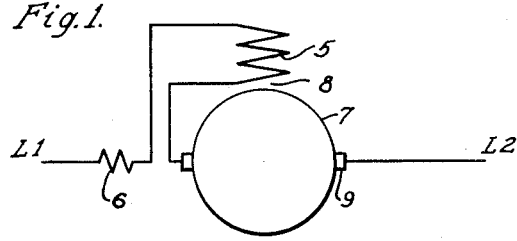
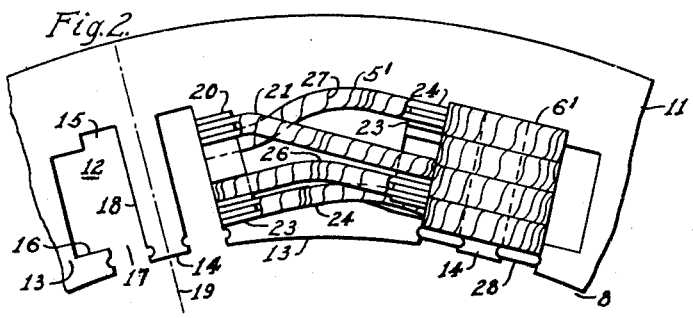
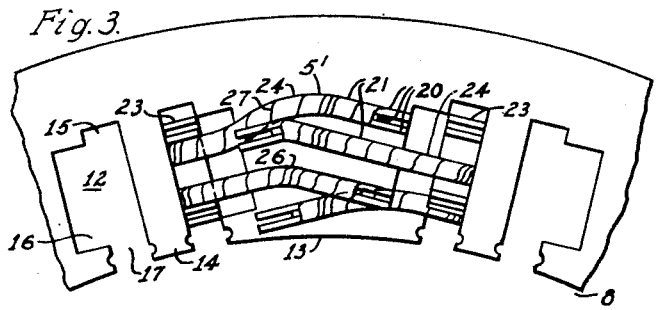
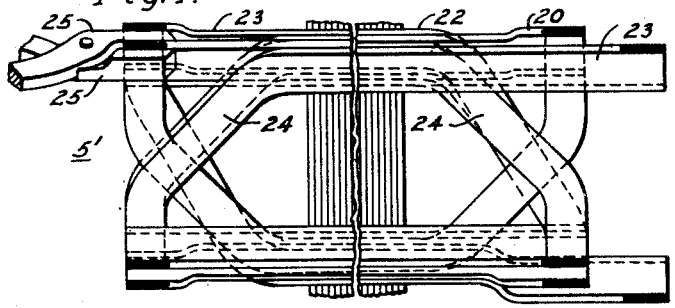
WITNESSES:
INVENTOR
Carl H. Sutherland.
BY
ATTORNEY July 24, 1951  C. H. SUTHERLAND  2,561,428
FIELD-COIL PUNCHING AND COIL Filed July 17, 1948  2 Sheets-Sheet 2

WITNESSES:
Wm. B. Sellers.
Rev. C. Groove

INVENTOR
Carl H. Sutherland.
BY O.B. Buchanan
ATTORNEY

Patented July 24, 1951

2,561,428

UNITED STATES PATENT OFFICE 2,561,428

FIELD-COIL PUNCHING AND COIL

Carl H. Sutherland, Pittsburgh, Pa., assignor to Westinghouse Electric Corporation, East Pittsburgh, Pa., a corporation of Pennsylvania Application July 17, 1948, Serial No. 39,321

8 Claims. (Cl. 171—252)

1

My invention relates generically to electric machines, but it was designed for, and has more particular relation to, the field-punching, and the main-field winding, of a series commutator dynamo-electric machine of a type which is provided with interpole windings. Still more particularly, my invention relates to single-phase series commutator motors such as are used for traction-purposes in electric-railway practice.

The stator-windings for single-phase series commutator motors have always been difficult and very expensive to make and assemble, on account of the slot-arrangements which are necessitated by the electrical design.

The object of my present invention is to provide a novel type of slot-arrangement, and a novel type of split field-coil, whereby the ends of the half-turns meet and straddle the ends of the adjoining half-turns in assembled position, while giving the largest possible clearance for facilitating the brazing of the joints at the respective ends of the motor.

With the foregoing and other objects in view, my invention consists in the combinations, assemblies, structures, parts, systems, and methods of manufacture and design, hereinafter described and claimed, and illustrated in the accompanying drawing, wherein:

Figure 1 is a conventional diagrammatic view of a series interpole single-phase commutator motor of the type to which my invention applies;

Fig. 2 is a fragmentary end-view of a portion of the stator-member, showing the shape of the stator-slots, and showing an end-view of some of the finished stator-coils;

Fig. 3 is an end-view similar to Fig. 2, showing the manner of assembling a main field-coil;

Fig. 4 is a diagrammatic developed view of one of the main field-winding coils, looking at the airgap-periphery of the stator-coil.

Figure 5:
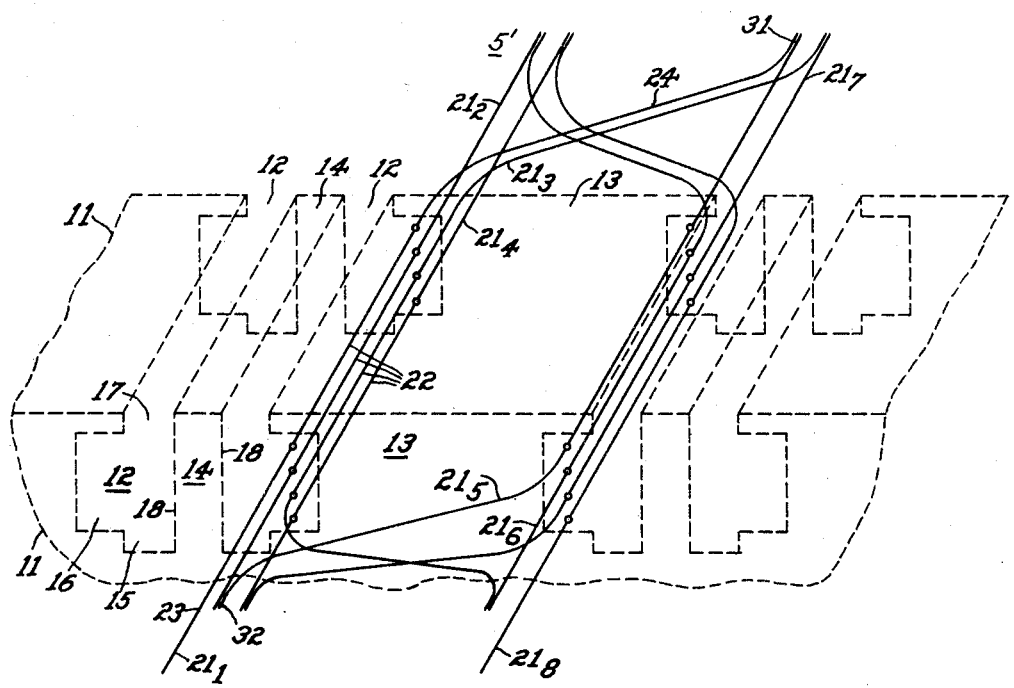
Fig. 5 is a diagrammatic developed perspective showing of a portion of the airgap side or bore of the stator-core, showing one of the main field-coils on one of the main poles of the machine.

By way of concrete illustration, my invention is shown, in Fig. 1, as being applied to a type of single-phase commutator-motor having a stationary member including a main field-winding 5 and an interpole-winding 6, said motor also having a rotatable commutator-type armature-winding 7, which is schematically or diagrammatically indicated by means of a single circle 7, which represents both the armature-core, the armature-winding, and the commutator which is associated therewith. The field-member 5—6

2 and the rotor-member 7 are separated by an airgap 8. Brushes 9 bear on the commutator 7. The motor in Fig. 1 is supplied with electrical power from a single-phase line L1—L2, which serially includes the interpole-winding 6, the main field-winding 5, and the armature 7.

My invention has particular applicability to the stationary field-member which carries the field-winding 5 and the interpole-winding 6. As shown in Figs. 2, 3 and 4, this stationary fieldmember also includes a stator-core 11 which is made up of a stack of stator-punchings, the airgap-periphery of which is provided with slots 12, between which are the stator "teeth." The stator "teeth" are of two kinds, alternating between teeth which constitute the main poles 13 and teeth which constitute the interpoles 14.

The slots 12 are of special shapes and are disposed in "back-to-back" pairs of slots, with the so-called "backs" of each pair of slots in the form of straight, open, slot-portions 15 which are disposed on opposite sides of an intervening interpole 14 of the core 11. These open slot-portions 15 are wide open to the gap 8, or to the periphery of the core which faces the rotating armaturemember 7 of the motor, as shown at 17. Each of the slots 12 also has an enlarged "front" portion 16, by which I mean a portion which extends away from the intervening interpole 14 which is disposed between the two slots of a given pair of "back-to-back" slots. These "front" slot-portions 16 are spaced back from the airgap 8, so that they have no slot-opening other than the slot-opening 17 of the open-slotted "backs" 15 of the same slot. This enlarged "front" portion 16 of each slot thus borders, or constitutes one side of, one of the main field-poles 13 of the core 11.

The main field-winding 5 of Fig. 1 consists of as many main-field coils 5' as there are motorpoles, each main-field coil 5' encircling one of the main poles 13 of the field-core 11, and there are more than two main poles. In like manner, the interpole winding 6 of Fig. 1 consists of a like number of interpole-coils 6', each encircling one of the interpoles 14 of the field-core 11. It will be noted that these two kinds of coils 5' and 6' alternate with each other, and are disposed in non-overlapping relation to each other, each coil encircling only its own individual "tooth", which may be either a main-pole "tooth" 13 or an interpole "tooth" 14, according as the coil in question is a main-field coil 5' or an interpole-coil 6'.

Each of the interpoles 14 is bounded by two straight slot-sides 18 which are substantially parallel with each other, which is another way of saying that the "back" slot-portions 15 of the pair of "back-to-back" slots 12 which have any particular interpole 14 between them are parallel to each other, so that the center-line 19 of the interpole will extend substantially radially.

In accordance with my invention, the main-field coils 5' are made in a special way, each being made up of a plurality of half-turns 21, and each of the coils 5' comprising more than one complete turn. For convenience in manufacture, each half-turn 21 is preferably made with a laminated conductor, which is more flexible, and hence easier to handle during assembly, than a single solid conductor of the same cross-section. As shown, each half-turn 21 is made up of three strap-conductors 20 stacked one on top of each other. Each half-turn 21 consists of a so-called coil-side or turn-side 22, which is a straight coil-side portion which lies in one of the slots 12. Each half-turn 21 also has two turn-ends 23 and 24, which extend out beyond the respective ends of the stator-core 11. In accordance with my invention, one of these turn-ends, such as 23, is usually "straight", in the sense that it lies substantially in the same radial plane as its coil-side 22, while the other turn-end 24 is usually bent circumferentially out of the radial plane of its coil-side 22, so that it comes into exact position to make a joint with a corresponding turn-end to which it is to be joined, in the next half-turn 21 of that coil 5'.

The successive half-turns 21 which make up each coil 5' alternate between a half-turn having a straight turn-end 23 and a half-turn having a bent turn-end 24, so as to stagger the joints between successive half-turns of the coil, at each end of the machine, as shown in Figs. 2 and 3. This is necessary in order to provide a coil-construction which leaves sufficient room for the jaws 25 (Fig. 4) of a brazing-tool to engage the joint which is to be brazed, between the successive half-turns 21 which, when properly jointed together, make up a multi-turn coil 5'. It will be understood that any of the coil-ends may be bent radially inwardly or outwardly any amount necessary to provide the maximum clearance for the brazing-jaws 25, these bends being indicated at 26 in Figs. 2 and 3.

The slot-lying coil-sides 22 of the stack of laminated conductors or straps 20 which together make up each of the half-turns 21 are preferably rigidly bound together with a common insulating covering 27, so that each half-turn 21 is handled as a unit, during the filed-winding assembly operation.

The assembly of eight half-turns $21_1$ to $21_8$ is shown in skeleton view in Fig. 5, making up a four-turn coil 5'. The front end of the coil, with its two terminals which are to be connected to the next main-winding coil 5' of the machine, is shown at the bottom of Fig. 5, while the rear end, which is seen in Fig. 2, is at the top of Fig. 5. The rear end of the first half-turn $21_1$, on one side of the main pole 13, is joined at 31 to the rear end of the first half-turn $21_5$ on the other side of the same main pole. Then the front end of this half-turn $21_5$ is joined at 32 to the front end of the second half-turn $21_2$ on the first side of the pole, and so on, as clearly shown in Fig. 5.

The peculiar shape of the stator-slots 12 cooperates with the special half-turn construction of the main-field coils 5' to make possible a novel manufacturing operation which considerably reduces the cost of the motor. As will be seen from Fig. 3, the slot-openings 17 of the "back" slot-portions 15 are substantially as wide, circumferentially, as the circumferential dimension of the "front" slot-portions 16, so that, before any of the interpole-coils 6' are put into place, it is possible to insert the rigid, preformed half-turns 21 of the main-field coils 5' in place, by passing the bound-together turn-sides 22 of each half-turn through the slot-opening 17 of the "back" slot-portions 15, and then moving the two groups of halves 21 of each of the coils 5' toward each other, so that the straight coil-side portions 22 of these coils occupy the "front" slot-portions 16, and the half-turn ends which are to be brazed together come into absolute mesh or register with each other, ready for the brazing operation, which can be performed with a suitable tool such as that which is indicated at 25 in Fig. 4. The stiff bent ends 26 of the half-turns can be cleared past each other by slight axial displacement of the pairs of joined half-turns 21 of each coil 5', while the same are being fitted together. These main-field coils 5' thus need no slot-closing wedge, because they are fitted laterally into an overhung slot which has no slot-opening of its own.

After the main-field coils 5' have been put into place, it is a simple matter to place the interpole-coils 6' on their respective interpoles 14'. It is thus possible, and usually desirable, to make each interpole-coil 6' as a completely preformed whole coil, which slips into place over the straight parallel sides 18 of its interpole 14, and which is held in place by a slot-closing wedge 28, which closes the slot-opening 17 of the "back" slot-portion 15.

While I have described my invention more particularly with respect to a single form of embodiment, as applied to one particular type of motor, I wish it to be understood that my invention is not limited in these particulars, and I desire that the appended claims shall be accorded the broadest construction consistent with their language.

I claim as my invention:

1. An electric machine having a relatively stationary member and a relatively movable member separated by a gap, one of said members being characterized by having a slotted magnetizable core, and having a winding carried by the slots of said core, said slots being of special shapes and being disposed in "back-to-back" pairs of slots, the so-called "backs" of each pair of slots being straight open slot-portions which are disposed on opposite sides of an intervening "tooth" of the core, said open slot-portions being wide open to the gap, each of the slots having an enlarged "front" portion extending away from said intervening "tooth" and spaced back from the gap of the machine, so that said "front" portions have no slot-opening other than the opening of the open-slotted "backs" of the slots the slot-openings of the "back" slot-portions being substantially as wide, circumferentially, as the circumferential dimension of the "front" slot-portions.

2. The invention as defined in claim 1, characterized by the slot-sides which bound the opposite sides of any one of the intervening "teeth" between the slots of said "back-to-back" pairs of slots being substantially parallel to each other.

3. The invention as defined in claim 1, characterized by said windings comprising two different kinds of coils, alternating with each other, and disposed in non-overlapping relation to each other, the coils of a first type of coils encircling the intervening "teeth" which are between the pairs of said "back-to-back" slots, each coil of said first type having its respective coil-sides in the respective "back" slot-portions of the adjacent "back-to-back" slots, and the coils of a second type of coils encircling other "teeth" which are between two "front" slot-portions of "front-to-front" pairs of slots, each coil of said second type being composed of separate half-turns having coil-sides lying in the respective "front" slot-portions and having joined-together turn-ends.

4. The invention as defined in claim 1, characterized by said windings comprising two different kinds of coils, alternating with each other, and disposed in non-overlapping relation to each other, the coils of a first type of coils encircling the intervening "teeth" which are between the pairs of each "back-to-back" slots, each coil of said first type having its respective coil-sides in the respective "back" slot-portions of the adjacent "back-to-back" slots, and the coils of a second type of coils encircling other "teeth" which are between two "front" slot-portions of "front-to-front" pairs of slots, each coil of said second type being composed of separate half-turns having coil-sides lying in the respective "front" slot-portions and having joined-together turn-ends, the slot-sides which bound the opposite sides of any one of the intervening "teeth" between the slots of said "back-to-back" pairs of slots being substantially parallel to each other, and the coils of the first type, which encircle said parallel-sided "teeth," being completely pre-formed whole coils.

5. A series commutator dynamo-electric machine having a relatively stationary field-member and a relatively rotatable armature-member having a commutator associated therewith and being separated from said field-member by an airgap, said field-member having more than two poles and comprising a stator core comprising a stack of magnetizable stator-punchings having a plurality of slots on their airgap-periphery, and a stator-winding carried by said slots, said slots forming intervening "teeth" which alternately constitute main field-poles and interpoles, the stator-winding comprising main field-coils which encircle said main field poles, and interpole-coils which encircle said interpoles, each slot comprising a "back" portion in the form of a straight, open, slot-portion bordering an interpole and wide open to the airgap, and an enlarged "front" portion extending away from said interpole and bordering a main field-pole and spaced back from the airgap, so that each "front" portion has no slot-opening other than the open-slotted "back" portion of the same slot, the slot-openings of the "back" slot-portions being substantially as wide, circumferentially, as the circumferential dimension of the "front" slot-portions, each main-field coil being composed of separate half-turns having coil-sides lying in the respective "front" slot-portions and having joined-together turn-ends.

6. A series commutator dynamo-electric machine having a relatively stationary field-member and a relatively rotatable armature-member having a commutator assocaited therewith and being separated from said field-member by an airgap, said field-member having more than two poles and comprising a stator core comprising a stack of magnetizable stator-punchings having a plurality of slots on their airgap-periphery, and a stator-winding carried by said slots, said slots forming intervening "teeth" which alternately constitute main field-poles and interpoles, the stator-winding comprising main field-coils which encircle said main field-poles, and interpole-coils which encircle said interpoles, each slot comprising a "back" portion in the form of a straight, open, slot-portion bordering an interpole and wide open to the airgap, and an enlarged "front" portion extending away from said interpole and bordering a main field-pole and spaced back from the airgap, so that each "front" portion has no slot-opening other than the open-slotted "back" portion of the same slot, the slot-openings of the "back" slot-portions being substantially as wide, circumferentially, as the circumferential dimension of the "front" slot-portions, each main-field coil being composed of separate half-turns having coil-sides lying in the respective "front" slot-portions and having joined-together turn ends, the two sides of each interpole being substantially parallel with each other, and each interpole-coil being a completely preformed whole coil.

7. The invention as defined in claim 5, characterized by each main-field coil comprising more than one turn and having the successive half-turns alternating between a half-turn having its turn-end lying substantially in the same radial plane as its coil-side, and a half-turn having its turn-end bent circumferentially out of the radial plane of its coil-side, so as to stagger the joints between successive half-turns of the coil, at each end of the machine.

8. The invention as defined in claim 6, characterized by each main-field coil comprising more than one turn and having the coil-sides of the half-turns composed of a plurality of conductors bound together with a common insulating covering, and successive half-turns alternating between a half-turn having its turn-end lying substantially in the same radial plane as its coil-side, and a half-turn having its turn-end bent circumferentially out of the radial plane of its coil-side so as to stagger the joints between successive half-turns of the coil, at each end of the machine.

CARL H. SUTHERLAND.

REFERENCES CITED

The following references are of record in the file of this patent:

UNITED STATES PATENTS

| Number | Name | Date |
|---|---|---|
| 1,045,159 | Lundell | Nov. 26, 1912 |
| 1,811,670 | Hansen | June 23, 1931 |
| 1,918,867 | Ringland | July 18, 1933 |
| 2,172,191 | Deuman | Sept. 5, 1939 |